(12) United States Patent
Kim et al.

(10) Patent No.: US 12,101,391 B2
(45) Date of Patent: *Sep. 24, 2024

(54) DATA DRIVING DEVICE AND METHOD FOR DRIVING THE SAME

(71) Applicant: SILICON WORKS CO., LTD., Daejeon (KR)

(72) Inventors: Do Seok Kim, Daejeon (KR); Yong Hwan Mun, Daejeon (KR); Myung Yu Kim, Daejeon (KR); Hyun Pyo Cho, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,056

(22) Filed: Apr. 21, 2023

(65) Prior Publication Data

US 2024/0080176 A1    Mar. 7, 2024

Related U.S. Application Data

(63) Continuation of application No. 17/234,228, filed on Apr. 19, 2021, now Pat. No. 11,671,237.

(30) Foreign Application Priority Data

Apr. 20, 2020    (KR) .......................... 10-2020-0047117

(51) Int. Cl.
*H04L 7/00*    (2006.01)
*H04L 7/02*    (2006.01)

(52) U.S. Cl.
CPC .............. *H04L 7/0087* (2013.01); *H04L 7/02* (2013.01)

(58) Field of Classification Search
CPC ....... H04L 7/02; H04L 7/0079; H04L 7/0087; H04L 7/033; H04L 7/0331–0337; H04L 7/04; H04L 7/041–043
See application file for complete search history.

(56) References Cited

U.S. PATENT DOCUMENTS

| | | | | |
|---|---|---|---|---|
| 5,757,238 A * | 5/1998 | Ferraiolo | ................ | H03L 7/089 455/260 |
| 5,978,425 A * | 11/1999 | Takla | .................... | H03L 7/0891 331/10 |
| 5,991,308 A * | 11/1999 | Fuhrmann | ............... | H04J 13/00 348/E7.07 |
| 6,307,868 B1 * | 10/2001 | Rakib | ....................... | H04L 5/06 375/325 |
| 6,515,553 B1 * | 2/2003 | Filiol | ................... | H03C 3/0925 375/376 |

(Continued)

FOREIGN PATENT DOCUMENTS

KR    10-1198964 B1    11/2012
KR    10-1252191 B1    4/2013
(Continued)

*Primary Examiner* — James M Perez
(74) *Attorney, Agent, or Firm* — ROTHWELL, FIGG, ERNST & MANBECK, P.C.

(57) ABSTRACT

The present disclosure relates to a data driving device and a method of driving the data driving device and, more particularly, to a data driving device and a method of driving the same in which a tuning of a set value of an internal circuit is automatically performed.

20 Claims, 10 Drawing Sheets

(56) References Cited

U.S. PATENT DOCUMENTS

| | | | | |
|---|---|---|---|---|
| 6,665,308 B1* | 12/2003 | Rakib | | H04L 27/362 |
| | | | | 370/479 |
| 6,937,617 B2* | 8/2005 | Rakib | | H04N 7/10 |
| | | | | 370/479 |
| 7,020,165 B2* | 3/2006 | Rakib | | H03M 13/256 |
| | | | | 348/E7.07 |
| 7,031,344 B2* | 4/2006 | Rakib | | H04L 25/4921 |
| | | | | 370/479 |
| 7,095,707 B2* | 8/2006 | Rakib | | H04N 7/17309 |
| | | | | 370/204 |
| 7,149,914 B1* | 12/2006 | Asaduzzaman | | H03L 7/18 |
| | | | | 713/503 |
| 7,239,650 B2* | 7/2007 | Rakib | | H04L 5/026 |
| | | | | 370/480 |
| 7,466,785 B2* | 12/2008 | Sanduleanu | | H03L 7/087 |
| | | | | 375/376 |
| 7,734,000 B2* | 6/2010 | Kuo | | H04L 7/033 |
| | | | | 375/360 |
| 7,974,375 B2* | 7/2011 | Kim | | H03L 7/087 |
| | | | | 375/360 |
| 8,028,223 B2* | 9/2011 | Miyazaki | | H04L 1/0067 |
| | | | | 714/755 |
| 8,362,996 B2* | 1/2013 | Huang | | G09G 3/20 |
| | | | | 345/99 |
| 8,842,745 B2* | 9/2014 | Hong | | H04L 7/0091 |
| | | | | 375/309 |
| 9,042,737 B2* | 5/2015 | Tanaka | | H04B 10/272 |
| | | | | 398/58 |
| 9,191,187 B2* | 11/2015 | Shibasaki | | H03L 7/24 |
| 9,191,194 B2* | 11/2015 | Robertson | | H04L 7/0016 |
| 9,197,403 B2* | 11/2015 | Gauthier | | H04L 7/0331 |
| 9,203,606 B2* | 12/2015 | Han | | H04L 7/04 |
| 9,276,592 B2* | 3/2016 | Lin | | H03L 7/0807 |
| 9,337,993 B1* | 5/2016 | Lugthart | | H04L 7/0037 |
| 9,379,878 B1* | 6/2016 | Lugthart | | H04L 7/033 |
| 9,413,517 B2* | 8/2016 | Takanashi | | H04L 7/0004 |
| 9,432,176 B2* | 8/2016 | Yu | | H04L 7/033 |
| 9,503,250 B2* | 11/2016 | Van Rens | | H04L 7/0008 |
| 9,553,742 B1* | 1/2017 | Xu | | H04L 25/0384 |
| 9,571,308 B1* | 2/2017 | Lugthart | | H04L 47/70 |
| 9,729,119 B1* | 8/2017 | Blatz | | H03G 3/3084 |
| 9,742,549 B1* | 8/2017 | Wang | | H04J 3/0647 |
| 9,742,550 B1* | 8/2017 | Lugthart | | H04L 27/38 |
| 9,742,689 B1* | 8/2017 | Wang | | H04L 7/0054 |
| 9,800,438 B1* | 10/2017 | Zhang | | H04L 25/03885 |
| 9,853,807 B2* | 12/2017 | Tsai | | H04L 7/0331 |
| 9,882,706 B1* | 1/2018 | Lugthart | | H04B 1/40 |
| 10,027,332 B1* | 7/2018 | Wang | | H04L 1/0082 |
| 10,141,963 B2* | 11/2018 | Yoo | | H04B 1/123 |
| 10,148,414 B2* | 12/2018 | Lugthart | | H04L 27/38 |
| 10,291,389 B1* | 5/2019 | Midha | | H04L 5/0048 |
| 10,305,495 B2* | 5/2019 | Behel | | H03L 7/06 |
| 10,490,158 B2* | 11/2019 | Kim | | H04N 25/00 |
| 10,727,839 B2* | 7/2020 | Kim | | G09G 3/2096 |
| 10,742,391 B1* | 8/2020 | Kenyon | | H03L 7/091 |
| 10,892,763 B1* | 1/2021 | Hidaka | | H03L 7/0807 |
| 10,892,911 B2* | 1/2021 | Wojciechowski | | H04L 7/0079 |
| 10,944,537 B2* | 3/2021 | Kim | | H04L 7/044 |
| 11,031,939 B1* | 6/2021 | Wolkovitz | | H03L 7/0802 |
| 11,082,051 B2* | 8/2021 | Allan | | H03L 7/087 |
| 11,133,920 B2* | 9/2021 | Lim | | H03L 7/0891 |
| 11,177,986 B1* | 11/2021 | Ganesan | | H04L 25/03878 |
| 11,223,468 B1* | 1/2022 | Ryu | | H04L 7/0087 |
| 11,455,927 B2* | 9/2022 | Kim | | G09G 3/2096 |
| 11,557,238 B2* | 1/2023 | Kim | | G09G 3/20 |
| 11,610,527 B2* | 3/2023 | Kim | | G09G 3/20 |
| 11,632,228 B2* | 4/2023 | Lim | | H03L 7/113 |
| | | | | 375/355 |
| 11,641,267 B2* | 5/2023 | Lee | | H04L 7/02 |
| | | | | 375/354 |
| 11,671,237 B2* | 6/2023 | Kim | | H04L 7/02 |
| | | | | 375/354 |
| 11,817,027 B2* | 11/2023 | Kim | | G09G 3/2096 |
| 2001/0001616 A1* | 5/2001 | Rakib | | H04L 1/006 |
| | | | | 375/259 |
| 2001/0024474 A1* | 9/2001 | Rakib | | H04B 1/7087 |
| | | | | 375/259 |
| 2001/0046266 A1* | 11/2001 | Rakib | | H04N 7/10 |
| | | | | 375/259 |
| 2002/0015423 A1* | 2/2002 | Rakib | | H04J 13/004 |
| | | | | 370/503 |
| 2003/0043950 A1* | 3/2003 | Hansen | | H03C 3/0933 |
| | | | | 375/376 |
| 2003/0156603 A1* | 8/2003 | Rakib | | H04J 13/00 |
| | | | | 348/E7.07 |
| 2004/0036639 A1* | 2/2004 | Hammes | | H03C 3/0941 |
| | | | | 341/143 |
| 2008/0141103 A1* | 6/2008 | Miyazaki | | H03M 13/2957 |
| | | | | 714/801 |
| 2010/0202386 A1* | 8/2010 | Takaoka | | H04L 1/0083 |
| | | | | 370/329 |
| 2011/0268202 A1* | 11/2011 | Hong | | H04L 7/0091 |
| | | | | 375/309 |
| 2013/0322880 A1* | 12/2013 | Tanaka | | H04L 7/0079 |
| | | | | 398/58 |
| 2014/0112425 A1* | 4/2014 | Tzeng | | H03L 7/0807 |
| | | | | 375/376 |
| 2016/0013929 A1* | 1/2016 | Takanashi | | H04L 7/0004 |
| | | | | 375/354 |
| 2017/0111071 A1* | 4/2017 | Yoo | | H04B 1/123 |
| 2017/0302431 A1* | 10/2017 | Lugthart | | H03M 5/12 |
| 2020/0028661 A1* | 1/2020 | Ogata | | H04B 10/6165 |
| 2021/0067310 A1* | 3/2021 | Lim | | H04L 7/0004 |
| 2021/0280110 A1* | 9/2021 | Kim | | G09G 3/2096 |
| 2021/0328757 A1* | 10/2021 | Kim | | H04L 7/0087 |
| 2021/0343214 A1* | 11/2021 | Kim | | G09G 5/008 |
| 2021/0390924 A1* | 12/2021 | Kim | | G09G 5/008 |
| 2022/0006604 A1* | 1/2022 | Lim | | H03L 7/113 |
| 2022/0028320 A1* | 1/2022 | Kim | | G09G 5/12 |
| 2022/0029779 A1* | 1/2022 | Lee | | H03L 7/0807 |
| 2022/0392387 A1* | 12/2022 | Kim | | G09G 3/2096 |
| 2023/0246801 A1* | 8/2023 | Lim | | H03L 7/099 |
| | | | | 375/355 |
| 2024/0080176 A1* | 3/2024 | Kim | | H04L 7/02 |

FOREIGN PATENT DOCUMENTS

| | | |
|---|---|---|
| KR | 10-2017-0044969 A | 4/2017 |
| KR | 10-2017-0081047 A | 7/2017 |

* cited by examiner

DATA DRIVING DEVICE AND METHOD FOR DRIVING THE SAME

CROSS REFERENCE TO RELATED APPLICATION

This application is a continuation application of U.S. patent application Ser. No. 17/234,228 filed on Apr. 19, 2021, which claims priority from Korean Patent Application No. 10-2020-0047117, filed on Apr. 20, 2020, which is hereby incorporated by reference for all purposes as if fully set forth herein.

BACKGROUND

1. Field of Technology

The present disclosure relates to a technology for driving a data driving device.

2. Description of the Prior Art

Generally, a display panel of a display device comprises a plurality of pixels disposed in a form of a matrix and each pixel comprises sub-pixels such as a red (R) sub-pixel, a green (G) sub-pixel, a blue (B) sub-pixel, or the like. Each sub-pixel emits light according to a greyscale included in image data so that an image is displayed in the display panel.

A display device may comprise a data processing device referred to as a timing controller and a data driving device referred to as a source driver. Image data may be transmitted from the data processing device to the data driving device. The image data is transmitted in a form of a digital signal and the data driving device converts the image data in a form of a digital signal into an analog voltage to drive each pixel.

As such, in order to drive a display panel, a data processing device and a data driving device must communicate with each other.

Conventionally, a frequency for communication between a data processing device and a data driving device was previously determined depending on a type of a display device.

In other words, a frequency for communication of a data processing device may be determined differently depending on a type of a display device and a communication circuit of a data driving device connected with the data processing device through a communication line must be tuned according to the frequency for communication of the data processing device.

Conventionally, the tuning of a data driving device according to a frequency for communication of a data processing device was manually performed.

Recently, since specification changes of a display device for the image quality improvement or the like are more frequent, a frequency for communication of a data processing device for driving a display device may be frequently changed. The manual tuning of a data driving device may cause an increase of time and manpower required for tuning.

SUMMARY OF THE INVENTION

In this background, an aspect of the present disclosure is to provide a technology for automatically tuning a data driving device in a display device.

To this end, in an aspect, the present disclosure provides a data driving device comprising: a clock recovery circuit to perform a clock training using a communication signal received during a plurality of time sections; and a control circuit to change a set value of a circuit, influenced by a frequency of the communication signal, among circuits of the clock recovery circuit in each time section, to check a result of a clock training in the clock recovery circuit according to the change of the set value in each time section, and determine an optimum value with respect to the set value.

The circuit may comprise an oscillator which is either a current control oscillator or a voltage control oscillator.

The set value may comprise a value of a reference current inputted into the current control oscillator or a value of a reference voltage inputted into the voltage control oscillator.

The set value may comprise a gain adjustment value to adjust a gain of the oscillator.

A frequency of the communication signal may be set to be within a predetermined range, the control circuit may gradually increase the set value in the respective time sections and transmit the set value to the clock recovery circuit, and then, the clock recovery circuit may increase oscillation frequencies of the oscillator in the respective time sections according to the set value, wherein an oscillation frequency in a first time section among the plurality of time sections may belong to a lowest frequency range within the predetermined range and an oscillation frequency in a last time section may belong to a highest frequency range within the predetermined range.

A frequency of the communication signal may be set to be within a predetermined range, the control circuit may gradually decrease the set value in the respective time sections and transmit the set value to the clock recovery circuit, and then, the clock recovery circuit may decrease oscillation frequencies of the oscillator in the respective time sections according to the set value, wherein an oscillation frequency in a first time section among the plurality of time sections may belong to a highest frequency range within the predetermined range and an oscillation frequency in a last time section may belong to a lowest frequency range within the predetermined range.

The set value may further comprise a value of a driving current supplied to the oscillator and, when increasing or decreasing the gain adjustment value in the respective time sections, the control circuit may increase or decrease the value of the driving current according to the gain adjustment value.

The control circuit may receive a lock signal for the clock training from the clock recovery circuit during the plurality of time sections and check a result of the clock training in each time section using the lock signal.

If the lock signal received in one of the plurality of time sections has a first level and lock signals received in the other time sections have a second level, the control circuit may determine a set value corresponding to the one time section as an optimum value.

If lock signals received in at least two consecutive time sections among the plurality of time sections have a first level and lock signals received in the other time sections have a second level, the control circuit may determine a medium value of at least two set values corresponding to the at least two time sections as an optimum value.

The data driving device may further comprise a receiving circuit to receive a clock recovered through the clock training from the clock recovery circuit and to recover data from the communication signal according to a recovered clock to output the data.

The control circuit may receive the data outputted from the receiving circuit during the plurality of time sections and check a result of the clock training in each time section using the data.

If data outputted in one of the plurality of time sections has a regular variation, whereas data outputted in the other time sections has an irregular variation, the control circuit may determine a set value corresponding to the one time section as an optimum value.

If data outputted in at least two consecutive time sections among the plurality of time sections has a regular variation, whereas data outputted in the other time sections has an irregular variation, the control circuit may determine a medium value of at least two set values corresponding to the at least two time sections as an optimum value.

In another aspect, the present disclosure provides a method of driving a data driving device, comprising: receiving a communication signal having a frequency within a predetermined range during a plurality of time sections; training a clock included in the communication signal by changing a set value of an internal circuit, influenced by a frequency of the communication signal, in each time section; and determining an optimum value of the set value according to a result of the clock training.

In training a clock, the internal circuit may comprise either a current control oscillator or a voltage control oscillator, the set value may comprise a value of a reference current inputted into the current control oscillator or a value of a reference voltage inputted into the voltage control oscillator, and the data driving device may gradually increase or decrease the value of the reference current or the value of the reference voltage in the respective time sections.

In training a clock, the internal circuit may comprise either a current control oscillator or a voltage control oscillator, the set value may comprise a gain adjustment value to adjust a gain of the current control oscillator or the voltage control oscillator, and the data driving device may gradually increase or decrease the gain adjustment value in the respective time sections.

In determining an optimum value, if a lock signal outputted in one of the plurality of time sections has a first level and lock signals outputted in the other time sections have a second level, the data driving device may determine a set value corresponding to the one time section as an optimum value.

In determining an optimum value, if lock signals outputted in at least two consecutive time sections among the plurality of time sections have a first level and lock signals outputted in the other time sections have a second level, the data driving device may determine a medium value of at least two set values corresponding to the at least two time sections as an optimum value.

In determining an optimum value, the data driving device may recover data from the communication signal according to a recovered clock through the clock training and, if data recovered in one of the plurality of time sections has a regular variation, whereas data recovered in the other time sections has an irregular variation, the data driving device may determine a set value corresponding to the one time section as an optimum value.

In determining an optimum value, the data driving device may recover data from the communication signal according to a recovered clock through the clock training and, if data recovered in at least two consecutive time sections has a regular variation, whereas data recovered in the other time sections has an irregular variation, the data driving device may determine a medium value of at least two set values corresponding to the at least two time sections as an optimum value.

As described above, according to the present disclosure, the data driving device may automatically tune a set value of an internal circuit according to a communication frequency of the data processing device, and therefore, time and manpower required for the tuning may be minimized.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
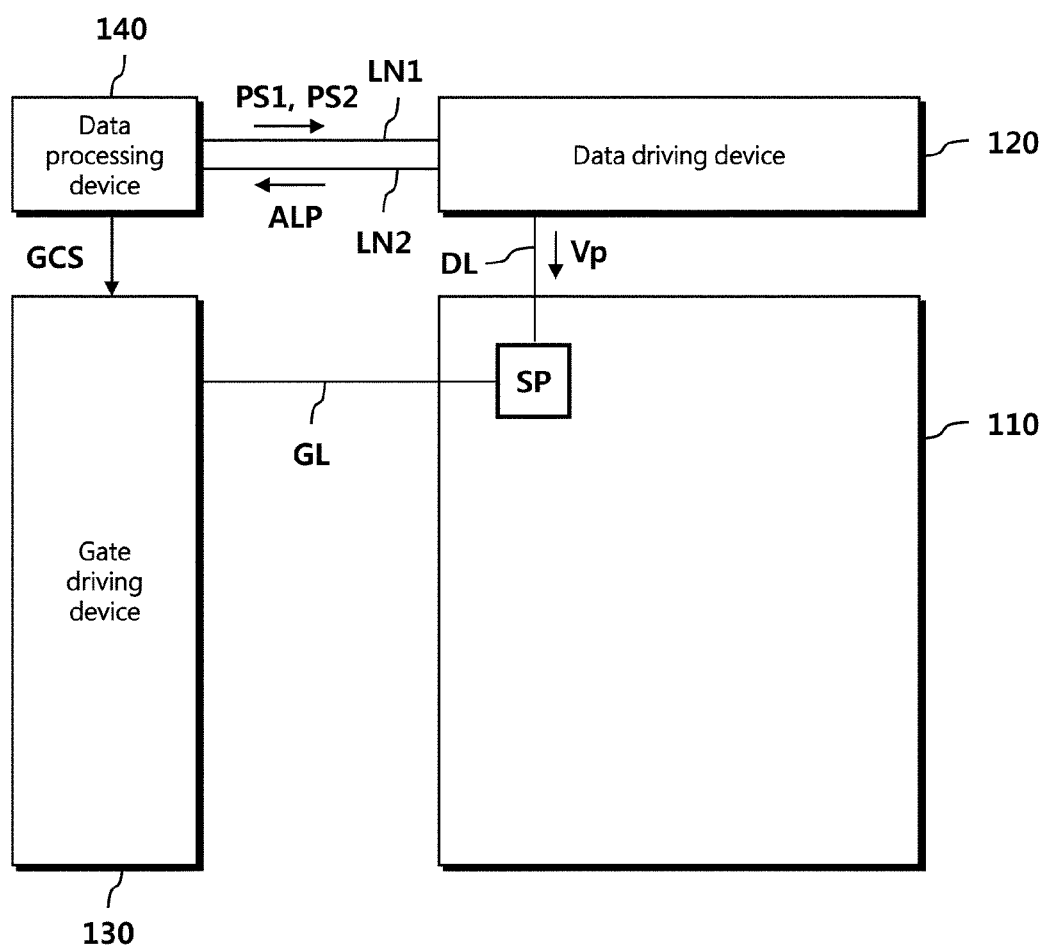
FIG. 1 is a configuration diagram of a display device according to an embodiment.

FIG. 1 is a configuration diagram of a display device according to an embodiment.

Referring to FIG. 1, a display device 100 may comprise a display panel 110, a data driving device 120, a gate driving device 130, and a data processing device 140.

On the display panel 110, a plurality of data lines DL and a plurality of gate lines GL may be disposed and a plurality of pixels P may also be disposed. A pixel P may comprise a plurality of sub-pixels. Here, a sub-pixel may be a red (R) sub-pixel, a green (G) sub-pixel, a blue (B) sub-pixel, or a white (W) sub-pixel. A pixel may comprise RGB sub-pixels SP, RGBG sub-pixels SP, or RGBW sub-pixels SP.

Hereinafter, for the convenience of description, the description will be made supposing that a pixel P comprises RGB sub-pixels.

The data driving device 120, the gate driving device 130, and the data processing device 140 are to generate signals for displaying an image on the display panel 110.

The gate driving device 130 may supply a gate driving signal, such as a turn-on voltage or a turn-off voltage, through a gate line GL. When a gate driving signal of a turn-on voltage is supplied to a sub-pixel SP, the sub-pixel SP is connected with a data line DL. When a gate driving signal of a turn-off voltage is supplied to a sub-pixel SP, the sub-pixel SP is disconnected from the data line DL. The gate driving device 130 may be referred to as a gate driver.

The data driving device 120 may supply a data voltage Vp to a sub-pixel SP through a data line DL. A data voltage Vp supplied through a data line DL may be supplied to a sub-pixel SP according to a gate driving signal. The data driving device 120 may be referred to as a source driver.

The data driving device 120 may comprise at least one integrated circuit, and this at least one integrated circuit may be connected to a bonding pad of a display panel 110 in a tape automated bonding (TAB) type or a chip-on-glass (COG) type, directly formed on a display panel 110, or integrated on a display panel 110 depending on a case. In addition, a data driving device 120 may be formed in a chip-on-film (COF) type.

The data processing device 140 may supply control signals to the gate driving device 130 and the data driving device 120. For example, the data processing device 140 may transmit a gate control signal GCS to initiate a scan to the gate driving device 130, output image data to the data driving device 120, and transmit a data control signal DCS to control the data driving device 120 to supply a data voltage Vp to each sub-pixel SP. The data processing device 140 may be referred to as a timing controller.

Figure 2:
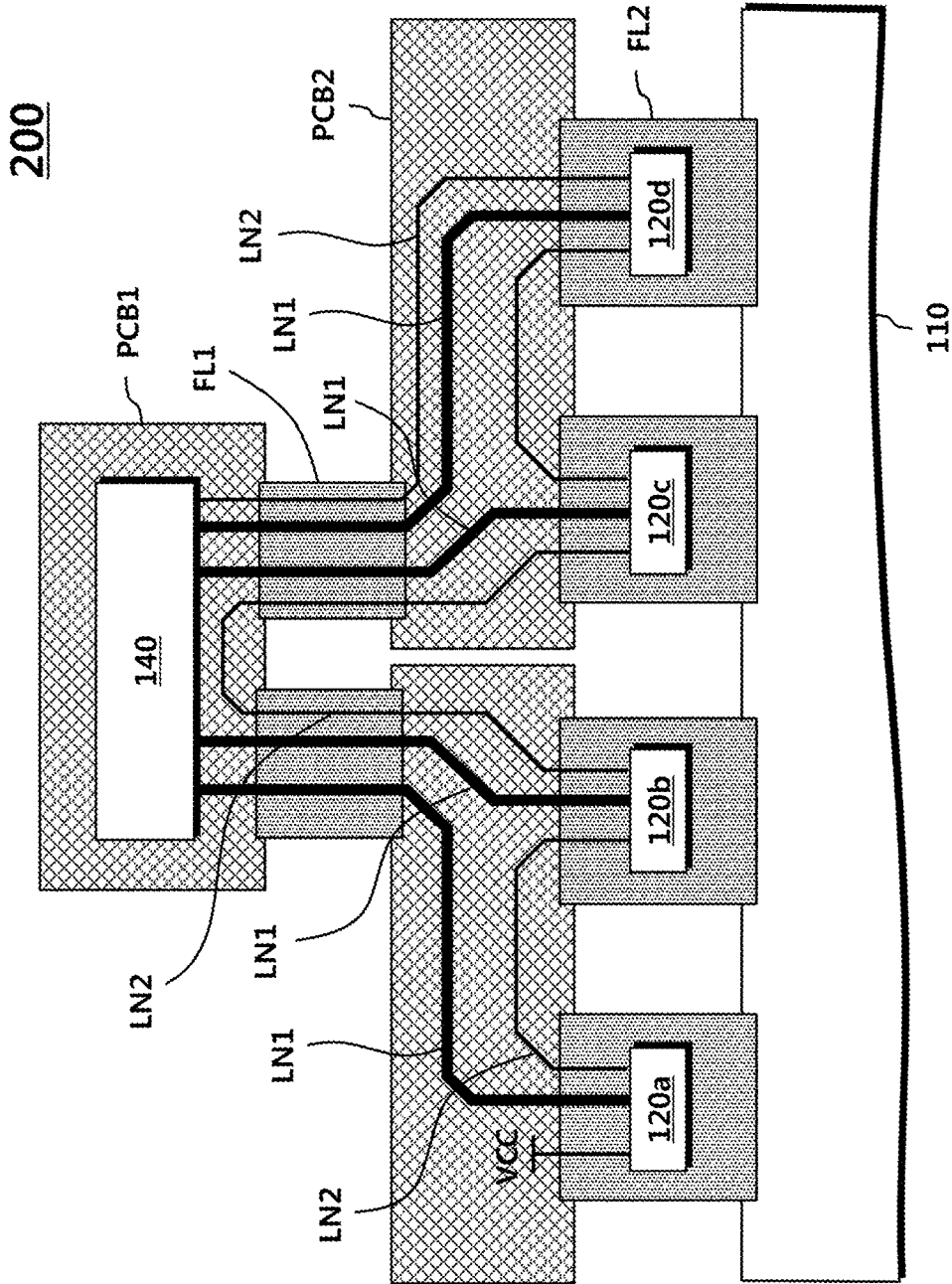
FIG. 2 is a configuration diagram of a system according to an embodiment.

FIG. 2 is a configuration diagram of a system according to an embodiment.

Referring to FIG. 2, the system may include at least one data processing device 140 and a plurality of data driving devices 120a, 120b, 120c, 120d.

The data processing device 140 may be disposed on a first printed circuit board PCB1. The data processing device 140 may be connected to the plurality of data driving devices 120a, 120b, 120c, 120d through a first communication line LN1 and a second communication line LN2.

The first communication line LN1 and the second communication line LN2 may reach the plurality of data driving devices 120a, 120b, 120c, 120d via a first PCB PCB1 and a second PCB PCB2. The first PCB PCB1 and the second PCB PCB2 may be connected to a first film FL1 made of a flexible material. The first communication line LN1 and the second communication line LN2 may extend from the first PCB PCB1 to the second PCB PCB2 via such a first film FL1.

Each of the data driving devices 120a, 120b, 120c, 120d may be disposed on a second film FL2 in the form of a COF. The second film FL2 may be a support substrate made of a flexible material that connects the second PCB PCB2 and the display panel 110. The first communication line LN1 and the second communication line LN2 may extend from the second PCB PCB2 to each of the data driving devices 120a, 120b, 120c, 120d via a second film FL2.

The first communication line LN1 may be connected one-to-one between the data processing device 140 and the data driving devices 120a, 120b, 120c, 120d.

The second communication lines LN2 may be connected between the respective data driving devices 120a, 120b, 120c, 120d or between the data driving device 120d and the data processing device 140 such that the second communication lines LN2 do not overlap the first communication lines LN1 in a plan view. For example, a first data driving device 120a may be connected to a second data driving device 120b through a second communication line LN2, and the second data driving device 120b may be connected to a third data driving device 120c through a second communication line LN2. Here, the second data driving device 120b and the third data driving device 120c may respectively be connected to different second PCBs PCB2. Accordingly, the second communication line LN2 disposed therebetween may connect the second data driving device 120b and the third data driving device 120c via a second PCB PCB2, a first film FL1, the first PCB PCB1, another first film FL1, and another second PCB PCB2. The third data driving device 120c may be connected to a fourth data driving device 120d through a second communication line LN2, and the fourth data driving device 120d may be connected to the data processing device 140 through a second communication line LN2.

As described above, the data processing device 140 and the data driving devices 120a, 120b, 120c, 120d may communicate with each other through the first communication lines LN1 and the second communication lines LN2.

Here, a frequency for communication between the data processing device 140 and the data driving devices 120a, 120b, 120c, 120d may not previously be determined.

In other words, communication circuits of the data driving devices 120a, 120b, 120c, 120d may not be tuned in conformity with the frequency for communication of the data processing device 140.

According to an embodiment, a procedure to be described below may be performed in order that the data driving devices 120a, 120b, 120c, 120d adjust set values of internal circuits according to the communication frequency of the data processing device 140. Here, a communication frequency may be referred to as a communication clock frequency and the internal circuits of the data driving device 120a, 120b, 120c, 120d may be circuits of which characteristics are changed according to the communication frequency.

Figure 3:
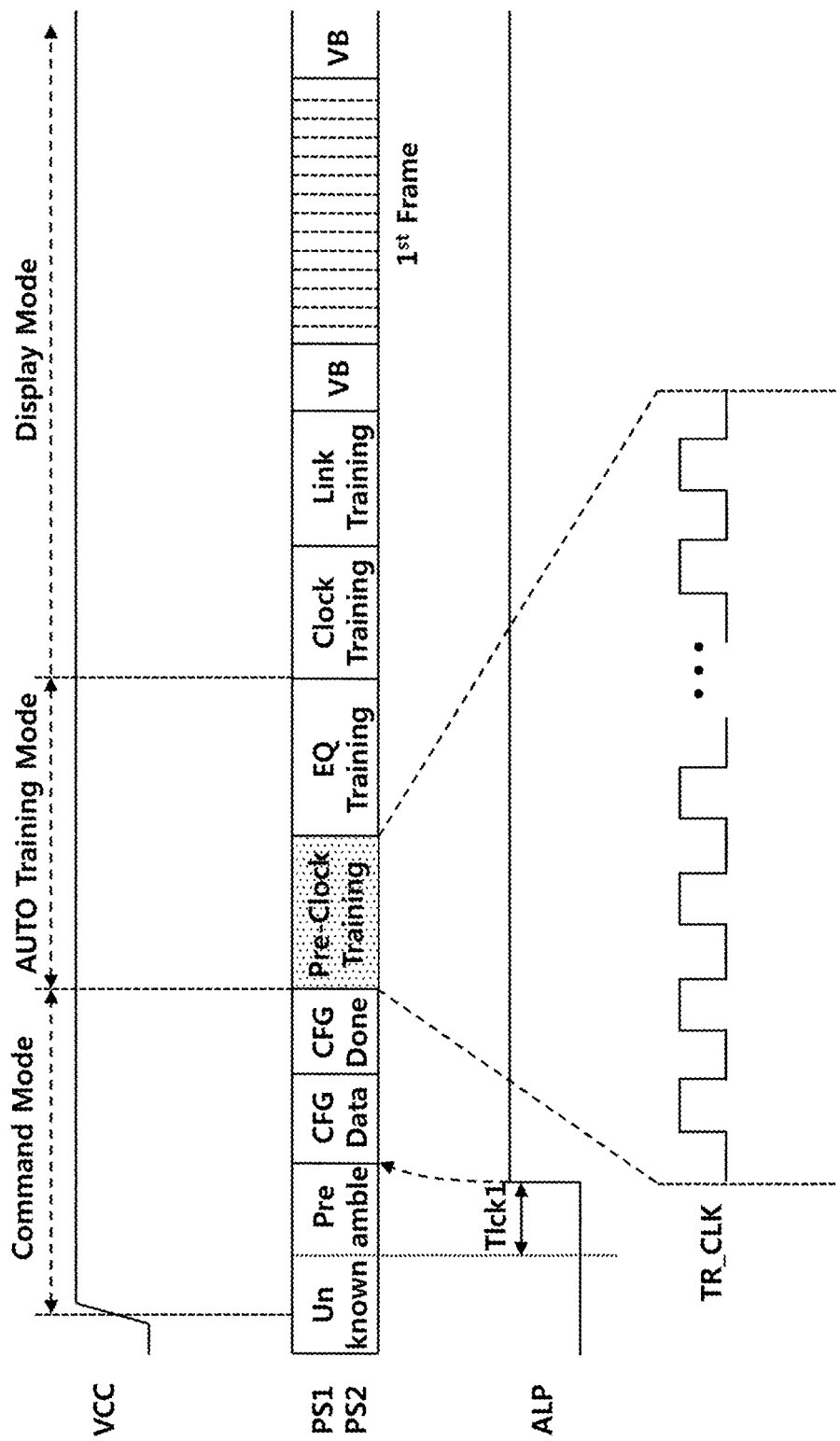
FIG. 3 is a diagram illustrating a sequence of a signal between a data processing device and a data driving device according to an embodiment.

FIG. 3 is a diagram illustrating a sequence of a signal between a data processing device and a data driving device according to an embodiment.

Referring to FIG. 3, when a driving voltage VCC is supplied to the data processing device 140 and the data driving device 120, the data processing device 140 may transmit a second protocol PS2 to the data driving device 120 within a predetermined time (for example, during a command mode in FIG. 3). The data processing device 140 may transmit a first protocol PS1 after transmitting the second protocol PS2. The first protocol PS1 and the second protocol PS2 may be transmitted through the first communication line LN in FIG. 2.

Here, the second protocol PS2, which is a system of rules established between the data processing device 140 and the data driving device 120, may be a low speed data communication protocol.

The first protocol signal PS1, which is a system of rules established between the data processing device 140 and the data driving device 120, may be a high speed data communication protocol.

A communication frequency of the first protocol PS1 may be 10 times higher than a communication frequency of the second protocol PS2. In terms of such a characteristic, the first protocol PS1 may be classified as a high speed data communication protocol and the second protocol PS2 may be classified as a low speed data communication protocol. In order to distinguish between a communication frequency of the first protocol PS1 and a communication frequency of the second protocol PS2, hereinafter, the communication frequency of the first protocol PS1 will be referred to as a first communication frequency and the communication frequency of the second protocol PS2 will be referred to as a second communication frequency.

In a high speed data communication, data loss rates may greatly differ or the communication may not be smooth depending on setups of a receiving circuit. For this reason, in the display device 100 according to an embodiment, a transmitting circuit may transmit setup data to a receiving circuit before performing a high speed data communication for a smooth high speed data communication. Here, the setup data may be transmitted or received through a low speed data communication. Since data loss rates do not greatly differ depending on setups of a receiving circuit in a low speed data communication, a set value may be transmitted relatively correctly to a receiving circuit.

The data processing device 140 may transmit setup data required for a high speed data communication by transmitting the second protocol PS2 associated with a low speed data communication before transmitting the first protocol PS1 associated with the high speed data communication.

The second protocol PS2 may comprise a preamble section, a CFG data section, and a CFG done section.

In the preamble section, the second protocol PS2 may comprise a low speed data communication clock signal. The data driving device 120 may train a clock using the low speed data communication clock signal and receive low speed data using a trained clock.

In the CFG data section, the second protocol PS2 may comprise the low speed data. The data driving device 120 may receive the low speed data using the trained clock (a low speed data communication clock). The low speed data may comprise setup data of the data driving device 120 for the high speed data communication, that is, a gain set value of an equalizer, scramble information, line polarity information, or the like. The data driving device 120 may set up circuits for the high speed data communication using the setup data. Here, the scramble information may comprise information about whether or not data is scrambled when the data processing device 140 transmits the data to the data driving device 120 and the line polarity information may comprise information indicating the polarity of a first line of a pixel.

In the CFG done section, the second protocol PS2 may comprise a message indicating the end of communication. The data driving device 120 may terminate communication according to the second protocol PS2 by checking this message.

An auxiliary communication signal ALP may maintain a low level at first and be changed to a high level when the training of a low speed data communication clock is completed. When a driving voltage is supplied to the data driving device 120, the data driving device 120 may maintain the auxiliary communication signal ALP at a low level, and then, change the auxiliary communication signal ALP at a high level when the training of the low speed communication clock is completed in the preamble section. After the level of the auxiliary communication signal ALP has been changed to be high, the data processing device 140 may transmit low speed data using the second protocol PS2. Here, the auxiliary communication signal ALP may be referred to as a lock signal LOCK and transmitted to the data processing device 140 through the second communication lines LN2 in FIG. 2.

In a case when there is any abnormality in an internal state or an unpredicted communication error occurs after changing the level of the auxiliary communication signal ALP to be high, the data driving device 120 may change the level of the auxiliary communication signal ALP to be low. For example, in a case when failing to receive low speed data or the clock cracks in the CFG data section or the CFG done section, the data driving device 120 may change the level of the auxiliary communication signal ALP to be low.

In an embodiment, a second communication frequency, that is, a frequency for the low speed data communication may be a predetermined frequency.

In other words, the second communication frequency may be a frequency commonly used in display devices 100 regardless of their specifications. The data driving device 120 may set up internal circuits in conformity with a predetermined second communication frequency to perform the low speed data communication with the data processing device 140.

Meanwhile, a first communication frequency, that is, a frequency for the high speed data communication is not predetermined. Accordingly, the data processing device 140 and the data driving device 120 may further include a pre-clock training section in the first protocol PS1 to set up internal circuits in conformity with the first communication frequency.

Specifically, the data processing device 140 may transmit the first protocol PS1 including a training clock pattern TR_CLK to the data driving device 120 in the pre-clock training section. Hereinafter, a signal of the first protocol PS1 transmitted to the data driving device 120 in the pre-clock training section will be referred to as a communication signal.

The data driving device 120 may divide the pre-clock training section into a plurality of time sections and train a clock in conformity with the training clock pattern TR_CLK included in the communication signal by changing a set value of an internal circuit in each time section.

The data driving device 120 may determine an optimum set value according to results of trainings in conformity with the training clock pattern TR_CLK and set up the internal circuit using the optimum set value.

The detailed description in this regard is as follows.

Figure 4:
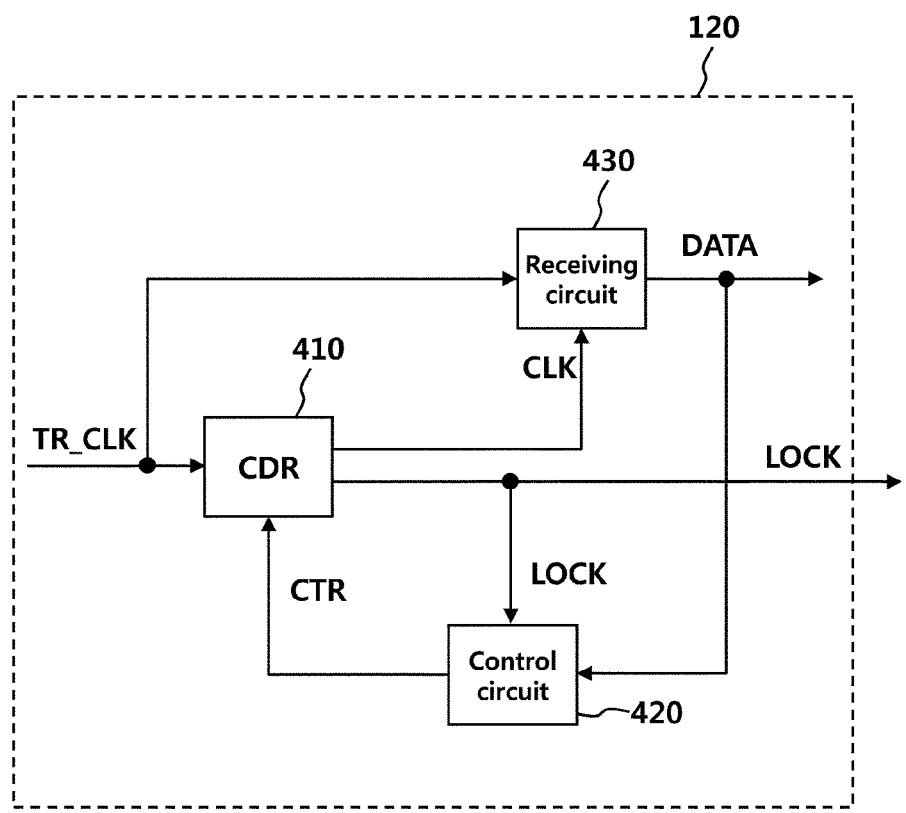
FIG. 4 is a configuration diagram of a data driving device according to an embodiment.

FIG. 4 is a configuration diagram of a data driving device according to an embodiment.

Referring to FIG. 4, the data driving device 120 may comprise a clock recovery circuit 410, a control circuit 420, and a receiving circuit 430.

The clock recovery circuit 410 may perform a clock training using a communication signal received during a plurality of time sections. Here, the communication signal may have one frequency within a predetermined frequency range. In other words, a frequency of the communication signal may be a first communication frequency included in a frequency range of the high speed data communication. The frequency range of the high speed data communication may be divided into N (N is a natural number equal to or higher than 1) ranges.

The clock recovery circuit 410 may comprise a circuit influenced by a frequency of the communication signal. The circuit may comprise an oscillator 520 shown in FIG. 5. The oscillator 520 may be either a current control oscillator (CCO) or a voltage control oscillator (VCO).

A set value CTR, to be described below in detail, that the control circuit 420 transmits to the clock recovery circuit 410 in each time section, may include a value of a reference current inputted into the current control oscillator or a value of a reference voltage inputted into the voltage control oscillator.

The set value CTR may include a gain adjustment value of the oscillator.

The clock recovery circuit 410 may receive set values CTR, gradually increasing in the respective time sections, from the control circuit 420. In this case, the clock recovery circuit 410 may increase oscillation frequencies of the oscillator 520 in the respective time sections according to the set values CTR. Here, an oscillation frequency in a first one of the plurality of time sections may be included in the lowest frequency range within a predetermined frequency range and an oscillation frequency in a last time section may be included in the highest frequency range within the predetermined frequency range. In other words, the reference current and the oscillation frequency, the reference voltage and the oscillation frequency, or a gain and the oscillation frequency of the oscillator may be proportional to each other.

Figure 7:
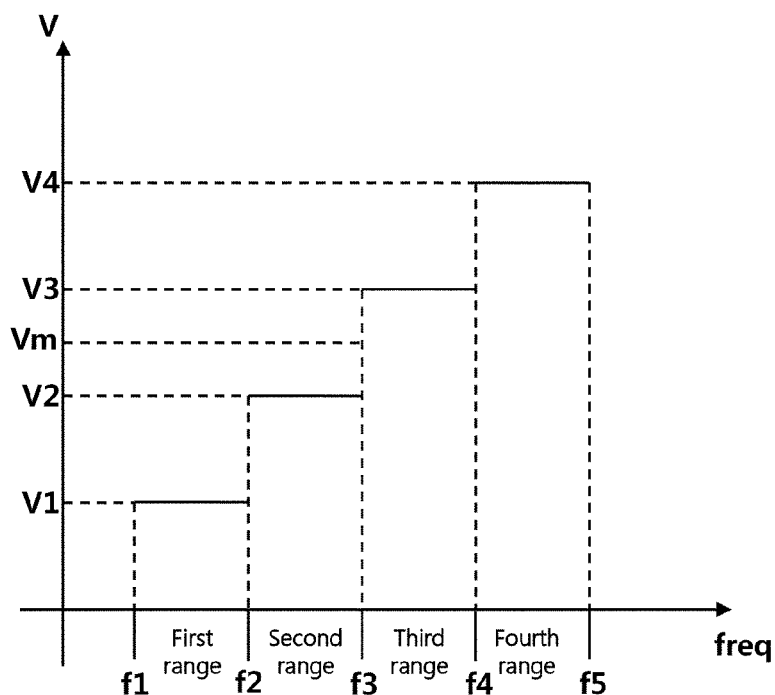
FIG. 7 and FIGS. 8A to 8C are diagrams illustrating an optimization of a set value of a clock recovery circuit in a data driving device according to an embodiment.

For example, in a case when the clock recovery circuit 410 receives voltage values V1→V2→V3→V4 gradually increasing in the respective time sections as shown in FIG. 7, a reference frequency in the first time section may be included in a first range f1-f2, which is the lowest frequency range within a predetermined frequency range f1-f5, and a reference frequency in the last time section may be included in a fourth range f4-f5, which is the highest frequency range within the predetermined frequency range f1-f5.

Meanwhile, the clock recovery circuit 410 may receive set values CTR gradually decreasing in the respective time sections from the control circuit 420. In this case, the clock recovery circuit 410 may decrease oscillation frequencies of the oscillator 520 in the respective time sections according to the set values CTR. Here, an oscillation frequency in the first one of the plurality of time sections may be included in the highest frequency range f4-f5 within the predetermined frequency range and an oscillation frequency in the last time section may be included in the lowest frequency range f1-f2 within the predetermined frequency range.

According to an embodiment, a set value CTR may further include a value of a driving current supplied to the oscillator 520.

In a case when a driving current value is included in a set value CTR, the clock recovery circuit 410 may receive current values or voltage values gradually increasing in the respective time sections together with the driving current value or receive current values or voltage values gradually decreasing in the respective time sections together with the driving current value from the control circuit 420.

The clock recovery circuit 410 may also receive gain adjustment values gradually increasing in the respective time sections together with the driving current value or receive gain adjustment values gradually decreasing in the respective time sections together with the driving current value from the control circuit 420.

Figure 8A:
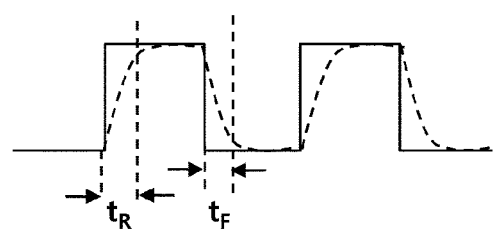

For example, in a case when the driving current of the oscillator 520 is either a first reference current or a first reference voltage, since an increasing time $t_R$ and a decreasing time $t_F$ of an actual wave (in a dotted line in FIG. 8A) of the oscillator 520 may be adjusted to conform with those of an ideal wave (in a solid line in FIG. 8A) of a first oscillation frequency as shown in FIG. 8A, waves outputted from the oscillator 520 may be formed in a normal state.

Figure 8B:
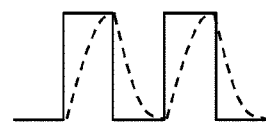

When either the first reference current or the first reference voltage is increased to either a second reference current or a second reference voltage while the driving current is fixed, since an increasing time and a decreasing time of an actual wave (in a dotted line in FIG. 8B) of a second reference frequency, which is higher than a first reference frequency, may be longer than those of an ideal wave (in a solid line in FIG. 8B) thereof as shown in FIG. 8B, waves outputted from the oscillator 520 may be formed in an abnormal state.

Figure 8C:
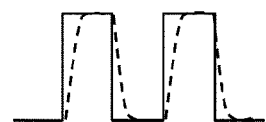

Here, if the driving current is increased according to the increase of a reference current, a reference voltage, or a gain, an increasing time and a decreasing time of an actual wave (in a dotted line in FIG. 8C) may be shortened as shown in FIG. 8C.

As described above, since a value of a driving current may affect an output of the oscillator 520, a value of a driving current may further be included in a set value CTR. Meanwhile, the clock recovery circuit 410 may receive different set values CTR from the control circuit 420 in the respective time sections.

A setup of a circuit may be changed according to the different set values CTR in the respective time sections and a clock training for a communication signal may be performed according to a changed setup. Here, the communication signal may include a training clock pattern TR_CRK.

In other words, the clock recovery circuit 410 may receive, in the respective time sections, different set values CTR of the oscillator 520 influenced by a frequency of a communication signal, change an oscillation frequency of the oscillator 520 according to a set value CTR received in a time section, which is different from the others received in the other time sections, and perform a clock training in conformity with a training clock pattern TR_CLK according to a changed oscillation frequency. Here, in a case when a set value CTR includes a value of a driving current, the clock recovery circuit 410 may change the driving current together with the oscillation frequency of the oscillator 520.

The clock recovery circuit 410 may generate an auxiliary communication signal ALP, that is, a lock signal LOCK indicating a result of a clock training in each time section and transmit it to the control circuit 420. The clock recovery circuit 410 may also transmit the lock signal LOCK to the data processing device 140 through the second communication line.

The clock recovery circuit 410 may change the level of the lock signal LOCK depending on a result of a clock training in each time section and output the lock signal LOCK.

For example, in a case when the pre-clock training section is divided into four time sections, if the clock recovery circuit 410 completes a clock training in a first time section and does not in the other three times sections, the clock recovery circuit 410 may output the lock signal LOCK of a first level in the first time section and output the lock signal LOCK of a second level changed from the first level in the other three time sections. Here, the first level may be high and the second level is low.

The clock recovery circuit 410 may recover a training clock pattern TR_CLK included in a communication signal by a clock training and transmit a recovered clock to the receiving circuit 430 to be described below.

When the pre-clock training section, which can be divided into a plurality of time section, starts, the control circuit 420 may transmit different set values CTR to the clock recovery circuit 410 in the respective time sections, In other words, when the pre-clock training section starts, the control circuit 420 may transmit different set values CTR to the clock recovery circuit 410 at starting time points of the respective time sections.

The control circuit 420 may receive a message indicating the end of the low speed data communication from the data processing device 140 in the CFG done section, which is before the pre-clock training section and terminate the low speed data communication, that is, a communication based on the second protocol PS2 by checking the message. Subsequently, the control circuit 420 may start the high speed data communication, that is, a communication based on the first protocol PS1 so that the pre-clock training section starts.

According to an embodiment, the control circuit 420 may store time section information used for dividing the pre-clock training section into a plurality of time sections and time information for the pre-clock training section. In addition, the control circuit 420 may store set values CTR of which the number corresponds to the number of the plurality of time sections.

The control circuit 420 may transmit set values CTR gradually increasing or decreasing in the respective time sections to the clock recovery circuit 410.

For example, in a case when a set value CTR includes a value of a reference voltage and the control circuit 420 stores voltage values V1, V2, V3, V4 sequentially according to size from the lowest voltage value V1, in a first time section where the pre-clock training section starts, the control circuit 420 may transmit the lowest voltage value V1 to the clock recovery circuit 410, and then, sequentially transmit the voltage values V2→V3→V4 increasing in the respective time sections to the clock recovery circuit 410.

Otherwise, the control circuit 420 may transmit the highest voltage value V4 to the clock recovery circuit 410, and then, sequentially transmit the voltage values V3→V2→V1 decreasing in the respective time sections to the clock recovery circuit 410.

In a case when a set value CTR further includes a value of a driving current of the oscillator 520, when increasing or decreasing a current value, a voltage value, or a gain adjustment value in each time section, the control circuit 420 may increase or decrease the value of a driving current as well and transmit the same to the clock recovery circuit 410.

After transmitting a set value CTR changed in each time section to the clock recovery circuit 410, the control circuit 420 may receive a lock signal LOCK regarding a clock training from the clock recovery circuit 410 and check a result of a clock training in each time section using the lock signal LOCK.

If a lock signal LOCK received in one of the plurality of time sections has a first level and lock signals LOCK received in the other time sections have a second level, the control circuit 420 may determine a set value CTR corresponding to the one time section as an optimum value.

Subsequently, the control circuit 420 may set a circuit of the clock recovery circuit 410 with the set value CTR corresponding to the one time section.

In other words, the control circuit 420 may set a reference current or a reference voltage of the oscillator 520 comprised in the clock recovery circuit 410 and may also set a driving current of the oscillator 520 with the set value CTR corresponding to the one time section.

For example, in a case when the number of the plurality of time section is 4, set values CTR corresponding to the respective time sections are V1, V2, V3, and V4 as shown in FIG. 7, a lock signal LOCK, that the control circuit 420 receives in a third time section, has a first level, and lock signals LOCK, that the control circuit 420 receives in the other time sections, have a second level, the control circuit 420 may set a reference voltage of the oscillator 520 with V3, which is a set value corresponding to the third time section.

Meanwhile, in a case when lock signals LOCK received in at least two consecutive time sections have the first level, and lock signals LOCK received in the other time sections have the second level, the control circuit 420 may determine a medium value of at least two set values CTR corresponding to the at least two time sections as an optimum value.

Subsequently, the control circuit 420 may set a circuit of the clock recovery circuit 410 with the medium value. Here, the first level may be high and the second level may be low.

For example, in a case when lock signals LOCK, that the control circuit 420 receives in a second time section and a third time section, have the first level and lock signals LOCK, that the control circuit 420 receives in the other time sections, have the second level, the control circuit 420 may set a reference voltage of the oscillator 520 with a medium value Vm of V2 and V3, which are set values corresponding to the second time section and the third time section.

When receiving a clock recovered through a clock training from the clock recovery circuit 410, the receiving circuit 430 may recover data from a communication signal according to the recovered clock and output the data.

Here, the communication signal may include a training clock pattern TR_CLK, which includes a regular variation, as shown in FIG. 3.

In a case when a clock training is completed in the clock recovery circuit 410, the receiving circuit 430 may recover data in a normal state from the communication signal according to a normal clock and output the data. In this case, the data outputted from the receiving circuit 430 may also have a regular variation.

For example, in a case when the receiving circuit 430 recovers data in a normal state according to a training clock pattern TR_CLK as shown in FIG. 3, the receiving circuit 430 may output data in which "0" alternates with "1" (for example, 0101010 . . . ).

However, in a case when a clock training is not completed in the clock recovery circuit 410, the receiving circuit 430 may recover data in an abnormal state from the communication signal according to an abnormal clock and output the data. In this case, the data outputted from the receiving circuit 430 may have an irregular variation.

For example, in a case when the receiving circuit 430 recovers data according to a training clock pattern TR_CLK as shown in FIG. 3, but the recovery is abnormal, the receiving circuit 430 may output data in which "0" and "1" irregularly appear (for example, 0011101011 . . . ) instead of the alternation of "0" and "1".

The receiving circuit 430 may transmit data having a regular or irregular variation to the control circuit 420.

The control circuit 420 may check results of clock trainings in the respective time sections using the data transmitted from the receiving circuit 430 in the respective time sections.

In a case when data outputted in one of a plurality of time sections has a regular variation and data outputted in the other time sections has an irregular variation, the control circuit 420 may determine a set value CTR corresponding to the one time section as an optimum value.

Subsequently, the control circuit 420 may set a circuit of the clock recovery circuit 410 with the set value CTR corresponding to the one time section.

Meanwhile, in a case when data outputted in at least two consecutive time sections has a regular variation and data outputted in the other time sections has an irregular variation, the control circuit 420 may determine a medium value of at least two set values CTR corresponding to the at least two time sections as an optimum value.

Subsequently, the control circuit 420 may set a circuit of the clock recovery circuit 410 with the medium value.

Hereinafter, a configuration of the clock recovery circuit 410 will be described in detail.

Figure 5:
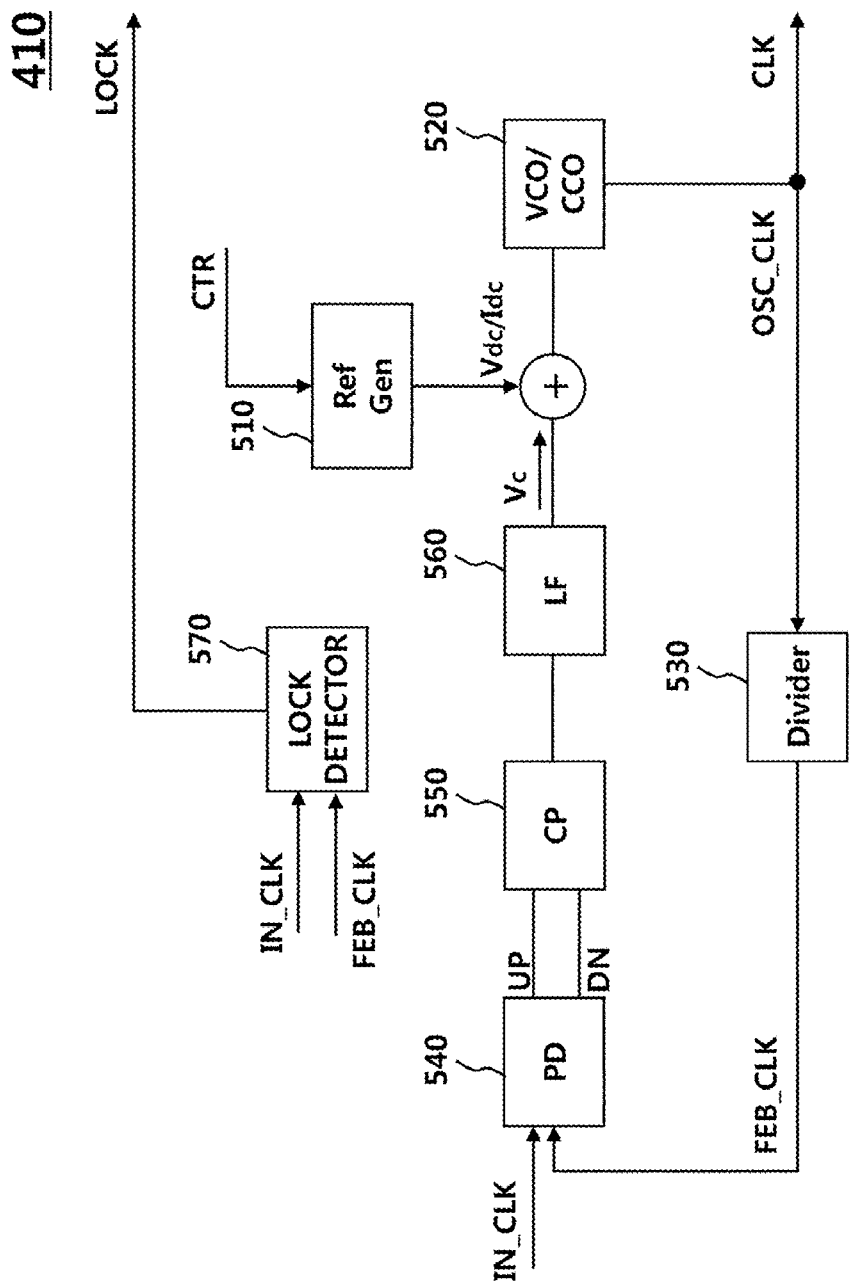
FIG. 5 and FIG. 6 are configuration diagrams of a clock recovery circuit according to an embodiment.
Figure 6:
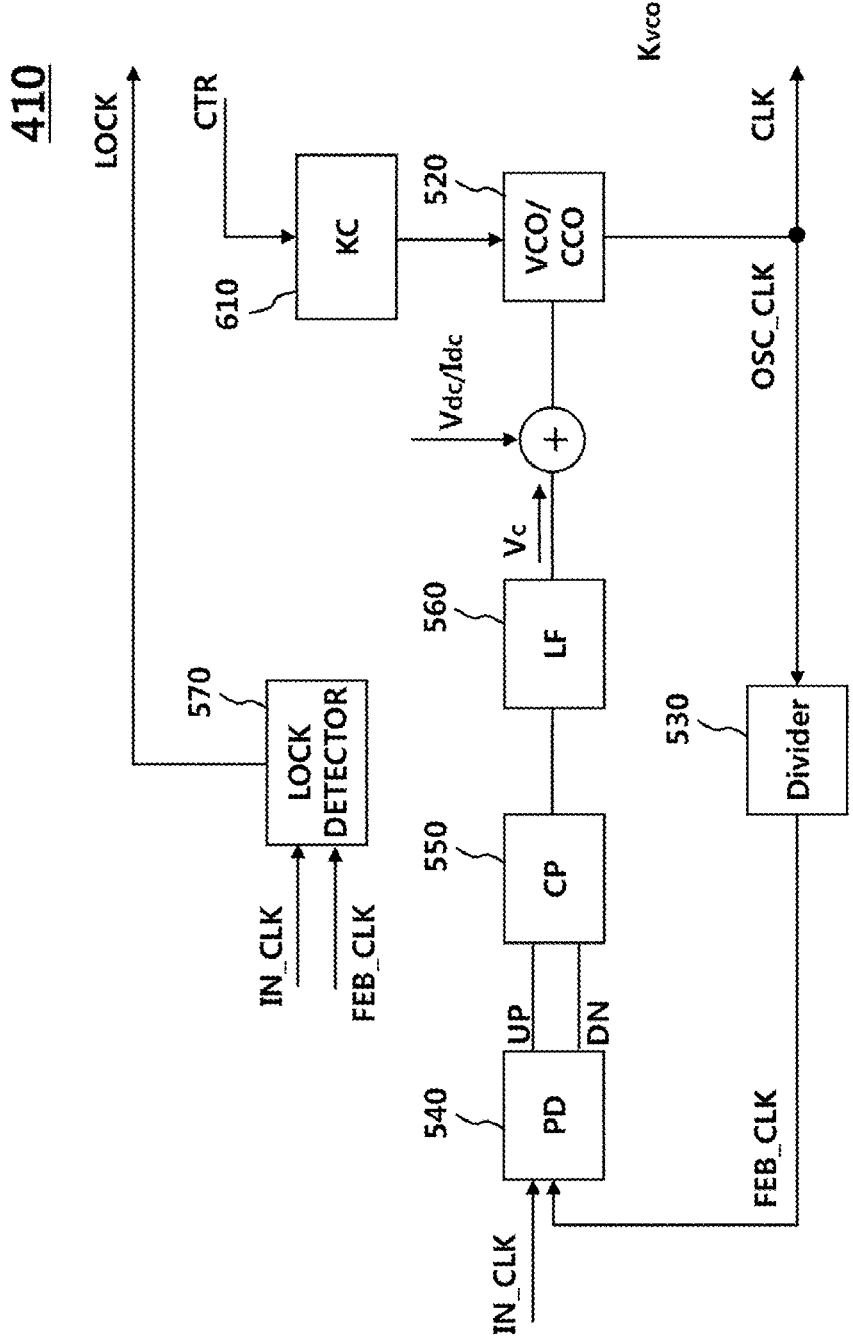

FIG. 5 and FIG. 6 are configuration diagrams of a clock recovery circuit according to an embodiment.

Referring to FIG. 5, the clock recovery circuit 410 may comprise a reference source generating circuit 510, an oscillator 520, a divider 530, a phase detector 540, a charge pump 550, a loop filter 560, and a lock detector 570.

The reference source generating circuit 510 may generate a reference current or a reference voltage used for determining an oscillation frequency of the oscillator 520 and supply it to the oscillator 520.

In the plurality of time sections corresponding to the pre-clock training section, the reference source generating circuit 510 may change a reference current $I_{dc}$ or a reference voltage $V_{dc}$ according to a set value CTR transmitted from the control circuit 420 in each time section.

For example, in a case when the number of the plurality of time sections is 4 and set values CTR corresponding to the respective time sections are voltage values V1, V2, V3, and V4, the reference source generating circuit 510 may generate a reference voltage $V_{dc}$ of a value V1 in a first time section according a set value CTR transmitted in a first time section, may change the reference voltage $V_{dc}$ to have a value V2 in a second time section according to a set value CTR of a second time section, and, in this way, may change lastly the reference voltage $V_{dc}$ to have a value V4 in a fourth time section according to a set value CTR of a fourth time section.

According to an embodiment, the clock recovery 410 may comprise a gain adjustment circuit 610 instead of the reference source generating circuit 510, as shown in FIG. 6.

The gain adjustment circuit 610 may adjust a gain $K_{vco}$ of the oscillator 520 used for determining an oscillation frequency of the oscillator 520.

In the plurality of time sections corresponding to the pre-clock training section, the gain adjustment circuit 610 may adjust a gain $K_{vco}$ according to a set value CTR transmitted from the control circuit 420 in each time section.

The oscillator 520 may be classified into an oscillator outputting sine wave and an oscillator outputting square wave. The oscillator outputting sine wave may comprise an RC element, an LC element, a crystal element, or the like, which selectively operate with respect to a frequency in a feedback loop and the oscillator outputting square wave may be a ring oscillator or a relaxation oscillator.

The oscillator may be either a current control oscillator CCO or a voltage control oscillator VCO. In a case when the oscillator 520 is a current control oscillator CCO, a voltage-current converter (not shown) to convert a control voltage $V_c$ into a current may be disposed at the front end of the oscillator 520.

The oscillator 520 may output an oscillation signal including an oscillation clock pattern OSC_CLK using a reference current L c or a reference voltage $V_{dc}$, a gain, and a control voltage $V_c$.

In a case when the oscillator 520 is a voltage control oscillator VCO, an oscillation frequency $\omega_{fb}$ of an oscillation signal may be determined by the following equation.

$$\omega_{fb} = K_{vco}(V_c - V_{dc})$$ [Equation 1]

In equation 1, $\omega_{fb}$ is a frequency of an oscillation signal, $\omega_0$ is a reference frequency of the voltage control oscillator VCO, $K_{vco}$ is a gain of the voltage control oscillator VCO, $V_c$ is a control voltage, and $V_{dc}$ is a reference voltage.

Here, the reference frequency of the oscillator 520 may mean a frequency of a signal oscillating in the oscillator 520 before an input clock pattern IN_CLK is inputted into the phase detector 540 and the level of the reference frequency may be proportional to the level of a reference current $I_{dc}$ or the level of a reference voltage $V_{dc}$, or the level of a gain $K_{vco}$.

The reference frequency of the oscillator 520 may be referred to as a free-running frequency.

In a plurality of time sections corresponding to the pre-clock training section, the oscillator 520 may output an oscillation signal having an oscillation frequency $\omega_{fb}$ different from those of other signals in each time section according to a reference current $I_{dc}$, a reference voltage $V_{dc}$, or a gain $K_{vco}$ changed in every time section.

In other words, a reference frequency too of the oscillator 520 may be determined differently according to a reference current $I_{dc}$, a reference voltage $V_{dc}$, or a gain $K_{vco}$ changed in every time section.

In this way, the oscillator 520 may output oscillation signals having different oscillation frequencies $\omega_{fb}$ in the respective time sections. Here, when a reference current $I_{dc}$, a reference voltage $V_{dc}$, or a gain $K_{vco}$ increases or decreases in each time section, a reference frequency $\omega_0$ may also increase or decrease according to the reference current $I_{dc}$, the reference voltage $V_{dc}$, or the gain $K_{vco}$. In addition, the oscillation frequency Wm may also increase or decrease according to the reference frequency $\omega_0$.

The divider 530 may divide an oscillation frequency (nib of an oscillation signal including an oscillation clock pattern OSC_CLK by a predetermined rate N.

In this way, the divider 530 may output a feedback signal having a frequency $\omega_{fb}/N$ obtained by dividing the oscillation frequency $\omega_{fb}$ by the predetermined rate N. The feedback signal may include a feedback clock pattern FEB_CLK. A period of the feedback clock pattern FEB_CLK may be determined by a value obtained by multiplying a period of an oscillation clock pattern OSC_CLK by the predetermined rate N.

The phase detector 540 may detect a phase difference between an input signal and a feedback signal and output an up signal Up or a down signal Down. Here, the output signal may include an input clock pattern IN_CLK having a period obtained by multiplying a period of a training clock pattern TR_CLK by the predetermined rate N.

When the phase difference between the input signal and the feedback signal is reduced, the frequency, in which the phase detector 540 outputs an up signal Up or a down signal Down, and their pulse width may also be reduced.

The charge pump 550 may store or release charges in a capacitor of the loop filter 560 according to the pulse width of the up signal Up or the down signal Down of the phase detector 540.

The charge pump 550 may store charges in the capacitor of the loop filter 560 with an up signal Up and it may release charges from the capacitor of the loop filter 560 with a down signal Down.

By the charge pump's 550 storing or releasing charges in or from the capacitor, the loop filter 560 may increase or decrease a control voltage $V_c$. In addition, the loop filter may output a control signal having a control voltage $V_c$. Here, the loop filter 560 may eliminate unnecessary elements such as harmonic wave from an up signal Up or a down signal Down.

The lock detector 570 may compare phases of an input clock pattern IN_CLK and a feedback clock pattern FEB_CLK. If there is no phase difference between the input clock pattern IN_CLK and the feedback clock pattern FEB_CLK, the lock detector 570 may output a lock signal LOCK of a first level, and, if there is a phase difference between the input clock pattern IN_CLK and the feedback clock pattern FEB_CLK, the lock detector 570 may output a lock signal LOCK of a second level. Here, the first level may be a high one indicating that the phases of an input signal and a feedback signal, that is, the phases of a communication signal and an oscillation signal are fixed, whereas the second level may be a low one indicating that the phases of an input signal and a feedback signal, that is, the phases of a communication signal and an oscillation signal are not fixed.

In other words, if there is no phase difference between a communication signal and an oscillation signal, the lock detector 570 may output a lock signal LOCK of the first level, and, if there is a phase difference between a communication signal and an oscillation signal, the lock detector 570 may output a lock signal LOCK of the second level.

Meanwhile, the lock detector 570 may also output a lock signal LOCK of the first level or the second level after checking data recovered in the receiving circuit 430.

For example, if the data recovered in the receiving circuit 430 comprises "0" and "1" alternating with each other (for example, 0101010 . . . ), the lock detector 570 may output a lock signal LOCK of the first level, and, if the data recovered in the receiving circuit 430 comprises "0" and "1" irregularly appearing (for example, 0011101011 . . . ), the lock detector 570 may output a lock signal LOCK of the second level.

With the aforementioned components, the clock recovery circuit 410 may perform a clock training in conformity with a training clock pattern TR_CLK of a communication signal.

Meanwhile, the phase detector 540 of the clock recovery circuit 410 may have a limited detection range (for example, $-\pi \sim +\pi$).

When a difference between levels of a reference frequency $\omega_0$ determining an oscillation frequency $\omega_{fb}$ and a first communication frequency, which is a frequency of a communication signal, is greater than a predetermined degree, a difference between levels of the oscillation frequency Wm and the first communication frequency may also be greater than the predetermined degree. Accordingly, a difference between levels of an input signal frequency and a feedback signal frequency $\omega_{fb}/N$ may also be greater than the predetermined degree.

In this case, a phase difference between the input signal and the feedback signal, that is, between the input clock pattern IN_CLK and the feedback clock pattern FEB_CLK may exceed a detection range of the phase detector 540, and therefore, the phase detector 540 may not detect the phase difference between the input signal and the feedback signal.

According to an embodiment, when performing a clock training associated with a communication signal, the clock recovery 410 may find a set value (a value of a reference current $I_{dc}$, a value of a reference voltage $V_{dc}$, or an adjustment value of a gain $K_{vco}$) corresponding to an oscillation frequency $\omega_{fb}$ having a level difference from a first communication frequency of the communication signal less than a predetermined degree, by changing a reference current $I_{dc}$, a reference voltage $V_{dc}$, or a gain $K_{vco}$ of the oscillator 520 at a predetermined time interval.

Figure 9:
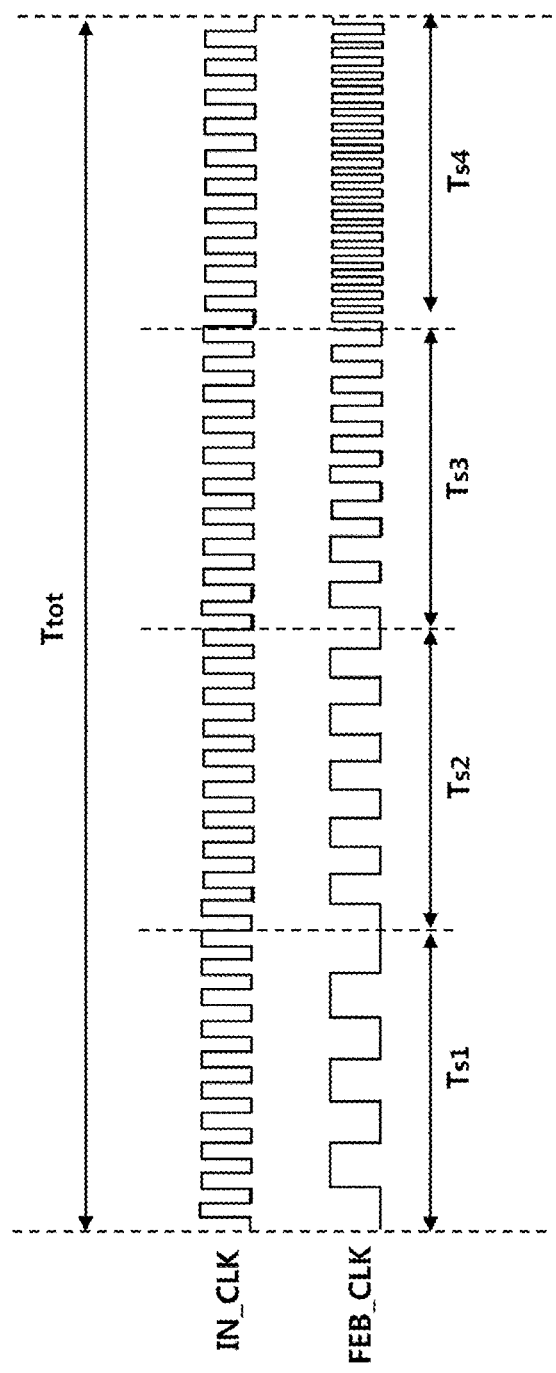
FIG. 9 is a diagram illustrating a determination of an optimum value for regarding a set value according to an embodiment.

For example, in a case when a time $T_{tot}$ corresponding to the pre-clock training section is divided into a plurality of time sections $T_{s1}$ to $T_{s4}$ and a clock pattern IN_CLK of an input signal and a clock pattern FEB_CLK of a feedback signal inputted into the phase detector 540 are as shown in FIG. 9, the phase detector 540 cannot detect a phase difference between the input signal and the feedback signal because levels of feedback signal frequencies $\omega_{fb}/N$ are lower than levels of input signal frequencies by more than a predetermined degree in a first time section $T_{s1}$ and a second time section $T_{s2}$ and a level of a feedback signal frequency $\omega_{fb}/N$ is higher than a level of an input signal frequency by more than the predetermined degree in a fourth time section $T_{s4}$.

On the contrary, since a level of a feedback signal frequency $\omega_{fb}/N$ is lower than a level of an input signal frequency by less than the predetermined degree, the phase detector 540 may detect a phase difference between the input signal and the feedback signal. In this case, the clock recovery circuit 410 may complete a clock training associated with a communication signal.

The control circuit 420 may check results of clock trainings in the respective time sections and set a circuit of the clock recovery circuit 410 with a set value CTR corresponding to the third time section after a plurality of time sections have passed.

As described above, according to an embodiment, the data driving device may perform clock trainings in changing a set value CTR of a circuit influenced by a communication frequency among circuits of the clock recovery circuit 410 at a predetermined time interval, determine an optimum set value in view of results of the clock trainings, and automatically change a setup of the circuit. Therefore, it is possible to minimize time and manpower required for the tuning of the data driving device.

Hereinafter, a process of determining an optimum set value for a first communication frequency of a communication signal in the data driving device will be described.

Figure 10:
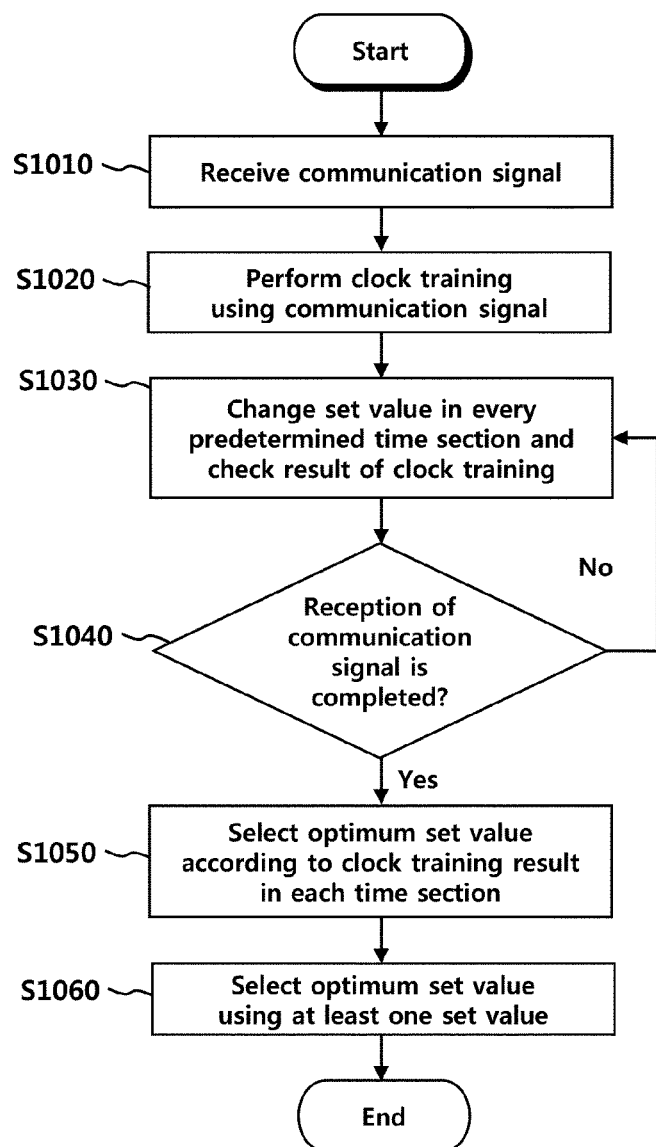
FIG. 10 is a flow diagram showing a process of determining an optimum value regarding a set value in a data driving device according to an embodiment.

FIG. 10 is a flow diagram showing a process of determining an optimum value regarding a set value in a data driving device according to an embodiment.

Referring to FIG. 10, when a driving voltage is supplied to the data processing device and the data driving device, the data driving device can receive a communication signal from the data driving device (S1010). Here, the communication signal may have one of frequencies within a predetermined range and the predetermined range may be a communication frequency range of a high speed data communication.

The data driving device may perform a clock training using the communication signal by changing a set value for an internal circuit influenced by a communication frequency in every predetermined time section and check a result of the clock training in each time section (S1020, S1030).

Here, the internal circuit may comprise the oscillator of the clock recovery circuit and the set value may comprise a value of a reference current used for determining a reference frequency of a current control oscillator, a value of a reference voltage used for determining a reference frequency of a voltage control oscillator, or a gain adjustment value used for adjusting a gain of the oscillator. The set value may further comprise a value of a driving current supplied to the oscillator.

The data driving device may repeat the step of S1030 until the reception of the communication signal is completed (S1040). Here, a time for the reception of the communication signal (for example, the pre-clock training section in FIG. 3) may previously be determined and the data driving device may store time section information used for dividing the time for the reception of the communication signal into a plurality of time sections and information of the reception time. In addition, the driving device may also store set values of which the number corresponds to the number of the plurality of time sections.

When the reception of the communication signal is completed, the data driving device may determine an optimum set value according to a result of a clock training in each time section (S1050).

In the step of S1050, if a lock signal outputted in one of the plurality of time sections has a first level and lock signals outputted in the other time sections have a second level, the data driving device may determine a set value corresponding to the one time section as an optimum value.

Otherwise, if lock signals outputted in at least two consecutive time sections have the first level and lock signals outputted in the other time sections have the second level, the data driving device may determine a medium value of at least two set values corresponding to the at least two time sections as an optimum value (S1060).

Before the step of S1050, the data driving device may recover data from the communication signal according to a clock recovered through a clock training. In the step of S1050, if data recovered in one of the plurality of time sections has a regular variation, whereas data recovered in the other time section has an irregular variation, the data driving device may determine a set value corresponding to the one time section as an optimum value.

Otherwise, in the step of S1060, if data recovered in at least two consecutive time sections has a regular variation, whereas data recovered in the other time section has a irregular variation, the data driving device may determine a medium value of at least two set values corresponding to the at least two time sections as an optimum value.

What is claimed is:

1. A display driving device comprising:
a clock recovery circuit configured to perform a clock training during a plurality of time sections, wherein the clock training is performed using a communication signal and a first set value corresponding to a frequency in each of the plurality of time sections; and
a control circuit configured to determine the first set value, transmit the first set value to the clock recovery circuit, and determine a second set value based on a result of the clock training, wherein
the clock recovery circuit includes an oscillator, and
wherein the clock recovery circuit is configured to adjust, based on the first set value, one or more of (i) a current and/or a voltage inputted into the oscillator, and/or (ii) a gain of the oscillator.

2. The display driving device of claim 1, wherein
the oscillator comprises a current control oscillator or a voltage control oscillator, and
the clock recovery circuit is configured to adjust, based on the first set value, a current inputted into the current control oscillator or a voltage inputted to the voltage control oscillator.

3. The display driving device of claim 1, wherein
a frequency of the communication signal is set to be within a predetermined frequency range,
the control circuit is configured to gradually increase the first set value during the plurality of time sections, in the respective time sections, and transmit the gradually increasing first set value to the clock recovery circuit, and then, the clock recovery circuit is configured to increase an oscillation frequency of the oscillator during the plurality of time sections according to the gradually increasing first set value,
an oscillation frequency in a first time section among the plurality of time sections belongs to a lowest frequency range within the predetermined frequency range, and
an oscillation frequency in a last time section among the plurality of time sections belongs to a highest frequency range within the predetermined frequency range.

4. The display driving device of claim 1, wherein
a frequency of the communication signal is set to be within a predetermined frequency range,
the control circuit is configured to gradually decrease the first set value during the plurality of time sections, in the respective time sections, and transmit the gradually decreasing first set value to the clock recovery circuit, and then, the clock recovery circuit is configured to decrease an oscillation frequency of the oscillator during the plurality of time sections according to the gradually decreasing first set value,
an oscillation frequency in a first time section among the plurality of time sections belongs to a lowest frequency range within the predetermined frequency range, and
an oscillation frequency in a last time section among the plurality of time sections belongs to a highest frequency range within the predetermined frequency range.

5. The display driving device of claim 1, wherein
the first set value comprises a value of a driving current supplied to the oscillator and,
when increasing or decreasing the gain adjustment value in the respective time sections, the control circuit is configured to increase and/or decrease the value of the driving current according to increasing and/or decreasing the gain adjustment value.

6. The display driving device of claim 1, wherein the control circuit is configured to receive a lock signal for the clock training from the clock recovery circuit during each of the plurality of time sections, and identify a result of the clock training in each time section using the lock signal.

7. The display driving device of claim 6, wherein, if a lock signal received in one of the plurality of time sections has a first level and lock signals received in the other time sections have a second level, the control circuit is configured to determine a set value corresponding to the one time section as a set value for the clock recovery circuit.

8. The display driving device of claim 6, wherein, if lock signals received in at least two consecutive time sections among the plurality of time sections have a first level and lock signals received in the other time sections have a second level, the control circuit is configured to determine a medium value of at least two set values corresponding to the at least two time sections as a set value for the clock recovery circuit.

9. The display driving device of claim 1, further comprising a receiving circuit to receive a clock recovered through the clock training from the clock recovery circuit and to recover data from the communication signal according to the recovered clock, in order to output the data.

10. The display driving device of claim 9, wherein the control circuit is configured to receive data outputted from the receiving circuit during the plurality of time sections and check a result of the clock training in each time section using the data.

11. The display driving device of claim 10, if data outputted in one of the plurality of time sections has a regular variation while data outputted in the other time sections has an irregular variation, the control circuit is configured to determine a set value corresponding to the one time section as a set value for the clock recovery circuit.

12. The display driving device of claim 10, if data outputted in at least two consecutive time sections among the plurality of time sections has a regular variation while data outputted in the other time sections has an irregular variation, the control circuit is configured to determine a medium value of at least two set values corresponding to the at least two time sections as a set value for the clock recovery circuit.

13. A method of driving a display driving device, comprising:
   receiving a communication signal having a frequency within a predetermined frequency range;
   training, in a clock recovery circuit, a clock included in the communication signal based on a first set value changed corresponding to a frequency, in each of a plurality of time sections; and
   determining a second set value for a clock training according to a result of the clock training, wherein
   a current or a voltage inputted into an oscillator included in the clock recovery circuit is adjusted based on the first set value.

14. The method of claim 13, wherein
   the oscillator comprises a current control oscillator, and
   the clock recovery circuit is configured to adjust a current inputted into the current control oscillator, based on the first set value.

15. The method of claim 13, wherein
   the oscillator comprises a voltage control oscillator, and
   the clock recovery circuit is configured to adjust a voltage inputted into the voltage control oscillator, based on the first set value.

16. The method of claim 13, wherein the first set value further comprises a gain adjustment value to adjust a gain of the oscillator.

17. The method of claim 16, wherein the display driving device is configured to gradually increase or decrease the gain adjustment value in the respective time sections.

18. The method of claim 13, wherein if a lock signal outputted in one of the plurality of time sections has a first level while lock signals outputted in the other time sections have a second level, the display driving device is configured to determine a set value corresponding to the one time section as a set value for the clock training.

19. The method of claim 13, wherein if lock signals outputted in at least two consecutive time sections among the plurality of time sections have a first level while lock signals outputted in the other time sections have a second level, the display driving device is configured to determine a medium value of at least two set values corresponding to the at least two time sections as a set value for the clock training.

20. The method of claim 13, wherein
   the display driving device is configured to recover data from the communication signal according to a recovered clock through the clock training and,
   if data recovered in one of the plurality of time sections has a regular variation while data recovered in the other time sections has an irregular variation, the display driving device is configured to determine a set value corresponding to the one time section as a set value for the clock training.

* * * * *